(12) United States Patent
Rezaie et al.

(10) Patent No.: US 12,113,614 B2
(45) Date of Patent: Oct. 8, 2024

(54) AIML POSITIONING RECEIVER FOR FLEXIBLE CARRIER AGGREGATION

(71) Applicants: Nokia Solutions and Networks Oy, Espoo (FI); Nokia Technologies Oy, Espoo (FI)

(72) Inventors: Sajad Rezaie, Aalborg (DK); Oana-Elena Barbu, Aalborg (DK)

(73) Assignees: Nokia Solutions and Networks Oy, Espoo (FI); Nokia Technologies Oy, Espoo (FI)

( * ) Notice: Subject to any disclaimer, the term of this patent is extended or adjusted under 35 U.S.C. 154(b) by 0 days.

(21) Appl. No.: 18/418,906

(22) Filed: Jan. 22, 2024

(65) Prior Publication Data

US 2024/0275517 A1    Aug. 15, 2024

(30) Foreign Application Priority Data

Feb. 9, 2023    (FI) .................................... 20235132
Feb. 15, 2023   (FI) .................................... 20235159

(51) Int. Cl.
*H04L 1/00*    (2006.01)
*H04L 25/02*   (2006.01)

(52) U.S. Cl.
CPC .......... *H04L 1/0006* (2013.01); *H04L 1/0005* (2013.01); *H04L 25/022* (2013.01)

(58) Field of Classification Search
CPC ... H04L 1/0005; H04L 1/0006; H04L 1/0041; H04L 1/0061; H04L 25/022; G06N 3/045; G01S 5/0278
See application file for complete search history.

(56) References Cited

U.S. PATENT DOCUMENTS

2021/0399769 A1    12/2021   Park et al.
2022/0007139 A1*   1/2022    Li .......................... G06N 3/045
(Continued)

FOREIGN PATENT DOCUMENTS

WO    WO-2022105907 A1    5/2022
WO    WO-2022190122 A1    9/2022

OTHER PUBLICATIONS

Jagannath et al., Redefining wireless communication for 6G: signal processing meets deep learning with deep unfolding, IEEE Trans. on artificial Intelligence, vol. 2, No. 6, pp. 528 to 536. (Year: 2021).*

(Continued)

*Primary Examiner* — Shelly A Chase
(74) *Attorney, Agent, or Firm* — Joseph C. Drish; Harrington & Smith

(57) ABSTRACT

An apparatus comprising circuitry configured to: receive a plurality of signal samples, wherein at least two of the signal samples are received on different carrier frequencies or over different durations; convert the plurality of signal samples to a common data format that stores as entries the samples, a stored entry corresponding to a sample measured with a carrier frequency, a time, and a receive antenna; generate entries of the common data format that are missing due to a sample not being measured with a carrier frequency, time, and receive antenna; wherein the entries of the common data format are ranked, wherein a higher ranking entry is considered more relevant than a relatively lower ranking entry; and generate at least one positioning measurement with a machine learning model, based on the entries of the common data format and the ranking of the entries of the common data format.

15 Claims, 9 Drawing Sheets

(56) References Cited

U.S. PATENT DOCUMENTS

2022/0046577 A1* 2/2022 Sundararajan ........ G01S 5/0278
2024/0064692 A1* 2/2024 Hirzallah ............ H04W 64/006

OTHER PUBLICATIONS

Intel Corporation, CATT, Ericsson "New WID on Expanded and Improved NR Positioning" 3GPP TSG RAN Meeting #98-e, RP-223549. Dec. 12-16, 2022.
LTE 5G "Moderator's Summary for Discussion [98e-13-R18-AIML-Air]" 3GPP TSG RAN #98-e, RP-223494. Dec. 12-16, 2022.
Qualcomm "New SI: Study on Artificial Intelligence (AI) Machine Learning (ML) for NR Air Interface" 3GPP TSG RAN Meeting #94-e, RP213599. Dec. 6-17, 2021.
3GPP TS 38.211 V18.1.0 $3^{rd}$ Generation Partnership Project; Technical Specification Group Radio Access Network; NR; Physical Channels and Modulation (Release 18) Dec. 2023. Sections 6.4 and 7.4.
Huawei, 3GPP TSG RAN WG1 Meeting #110obis-e R1-2210753, Summary #7 of [110bis-e-R18-AI/ML-02], Discussion and Decision, e-Meeting, Oct. 10-19, 2022.
Vivo, "Other aspects on AI/ML for Positioning Accuracy Enhancement" 3GPP TSG RAN WGI #110, R1-2206037, Discussion and Decision, Aug. 12, 2022.
Vivo, 3GPP TSG-RAN WG1 Meeting #110bis-e, R1-2210565, Summary #3 if [110bis-e-R18-AI/ML-07], Discussion and Decision, e-Meeting, Oct. 10-19, 2022.

* cited by examiner

AIML POSITIONING RECEIVER FOR FLEXIBLE CARRIER AGGREGATION

RELATED APPLICATION

This application claims priority to FI Application Number 20235132, filed Feb. 9, 2023, which is hereby incorporated by reference in its entirety, and this application also claims priority to FI Application Number 20235159, filed Feb. 15, 2023, which is hereby incorporated by reference in its entirety.

TECHNICAL FIELD

The examples and non-limiting example embodiments relate generally to communications and, more particularly, to an AIML positioning receiver for flexible carrier aggregation.

BACKGROUND

It is known to aggregate carriers and to determine position of a terminal device in a communication network.

SUMMARY

In accordance with an aspect, an apparatus includes at least one processor; and at least one memory storing instructions that, when executed by the at least one processor, cause the apparatus at least to: receive a plurality of signal samples, wherein at least two of the signal samples are received on different carrier frequencies, or wherein at least two of the signal samples are received over different durations; convert the plurality of signal samples to a common data format that stores as entries the plurality of signal samples, a stored entry corresponding to a signal sample measured with a carrier frequency, a time, and a receive antenna; generate entries of the common data format that are missing due to a signal sample not being measured with a carrier frequency, time, and receive antenna; wherein the entries of the common data format are ranked, wherein a higher ranking entry is considered more relevant than a relatively lower ranking entry; and generate at least one positioning measurement with a machine learning model, based on the entries of the common data format and the ranking of the entries of the common data format.

In accordance with an aspect, an apparatus includes at least one processor; and at least one memory storing instructions that, when executed by the at least one processor, cause the apparatus at least to: receive a plurality of signal samples, wherein at least two of the signal samples are received with different resource elements; convert the plurality of signal samples to a common data format that stores as entries the plurality of signal samples, a stored entry corresponding to a signal sample measured with a resource element; generate entries of the common data format that are missing due to a signal sample not being measured with a resource element; wherein the entries of the common data format are ranked, wherein a higher ranking entry is considered more relevant than a relatively lower ranking entry; and generate at least one positioning measurement with a machine learning model, based on the entries of the common data format and the ranking of the entries of the common data format.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
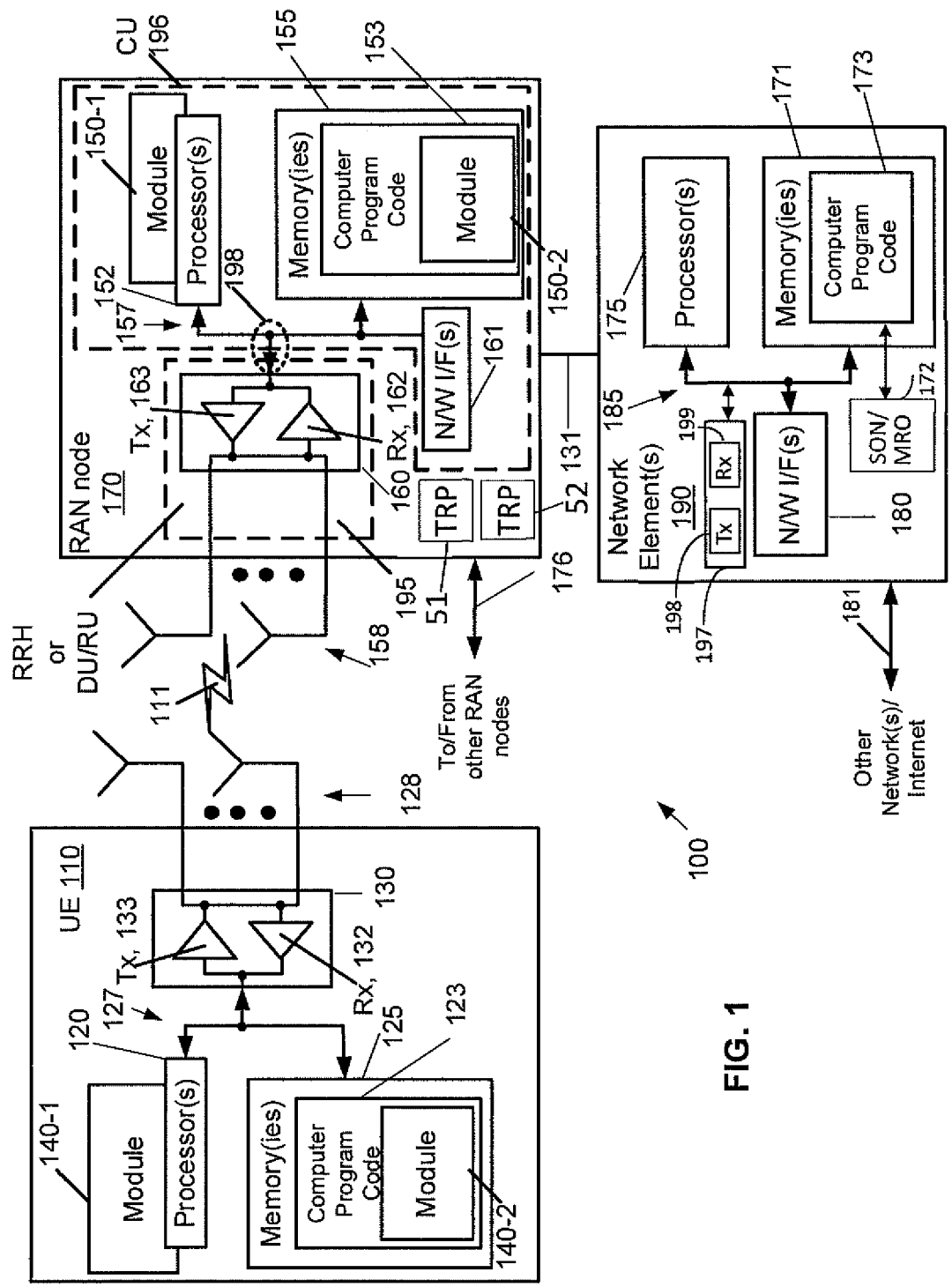
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UH 110 communicates with RAN node 170 via a wireless link 111.

The RAN node 170 in this example is a base station that provides access for wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, one or more memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

A RAN node/gNB can comprise one or more TRPs to which the methods described herein may be applied. FIG. 1 shows that the RAN node 170 comprises two TRPs, TRP 51 and TRP 52. The RAN node 170 may host or comprise other TRPs not shown in FIG. 1.

A relay node in NR is called an integrated access and backhaul node. A mobile termination part of the IAB node facilitates the backhaul (parent link) connection. In other words, the mobile termination part comprises the functionality which carries UE functionalities. The distributed unit part of the IAB node facilitates the so called access link (child link) connections (i.e. for access link UEs, and backhaul for other IAB nodes, in the case of multi-hop IAB). In other words, the distributed unit part is responsible for certain base station functionalities. The IAB scenario may follow the so called split architecture, where the central unit hosts the higher layer protocols to the UE and terminates the control plane and user plane interfaces to the 5G core network.

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (mobility management entity)/SGW (serving gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. Computer program code 173 may include SON and/or MRO functionality 172. The one or more network elements 190 include a transceiver 197 comprising a transmitter 198 and a receiver 199. The transceiver is bidirectionally interconnected via the bus 185 to processor 175 and the one or more memories 171.

The wireless network 100 may implement network virtualization, which is the process of combining hardware and software network resources and network functionality into a single, software-based administrative entity, or a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects, The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback devices having wireless communication capabilities, internet appliances including those permitting wireless internet access and browsing, tablets with wireless communication capabilities, head mounted displays such as those that implement virtual/augmented/mixed reality, as well as portable units or terminals that incorporate combinations of such functions. The UE 110 can also be a vehicle such as a car, or a UH mounted in a vehicle, a UAV such as e.g. a drone, or a UE mounted in a UAV. The user equipment 110 may be terminal device, such as mobile phone, mobile device, sensor device etc., the terminal device being a device used by the user or not used by the user.

UE 110, RAN node 170, and/or network element(s) 190, (and associated memories, computer program code and modules) may be configured to implement (e.g. in part) the methods described herein, including an AIML positioning receiver for flexible carrier aggregation. Thus, computer program code 123, module 140-1, module 140-2, and other elements/features shown in FIG. 1 of UE 110 may implement user equipment related aspects of the examples described herein. Similarly, computer program code 153, module 150-1, module 150-2, and other elements/features shown in FIG. 1 of RAN node 170 may implement gNB/TRP and network node/element related aspects of the examples described herein. Computer program code 173 and other elements/features shown in FIG. 1 of network element(s) 190 may be configured to implement network element related aspects of the examples described herein.

The AIMI, positioning receiver as described herein may be implemented as part of transceiver 130 including receiver 132, as part of transceiver 160 including receiver 162, or as part of transceiver 197 including receiver 199.

Having thus introduced a suitable but non-limiting technical context for the practice of the example embodiments, the example embodiments are now described with greater specificity.

The examples described herein relate to the new Rel. 18 WID on expanded and improved NR positioning [RP-223549] and on AI/ML for air interface [RP-223494].

In [RP-223549] it has been agreed to aggregate multiple intra-band contiguous carriers: "Regarding higher accuracy, two additional techniques have been considered in Rel-18: one is to take advantage of the rich 5G spectrum to increase the bandwidth for the transmission and reception of the positioning reference signals based on PRS/SRS bandwidth aggregation for intra-band contiguous carriers, and the other is to use the NR carrier phase measurements."

Specify bandwidth aggregation for positioning measurements across up to three intra-band contiguous carriers [RAN1, RAN2, RAN4].
  Specify signalling and procedures to support aggregation of PRS/SRS (respectively) resources across PFLs/carriers (respectively) for positioning measurements under the assumption that the signals over aggregated resources are transmitted and received (respectively) using a single RF chain (same antenna) [RAN1, RAN2].
    NOTE: The support of bandwidth aggregation for positioning measurements applies only to timing related measurements (e.g., RSTD, RTOA, and UE/gNB Rx-Tx time difference).
  Specify RRM requirements with measurement gaps in connected mode, and in inactive mode, including PRS measurement period/reporting [RAN4].

The Rel-18 SI and now WI on Artificial Intelligence (AI)/Machine Learning (ML) for NR Air Interface [3GPP RP-213599, RP-223494] aims at exploring the benefits of augmenting the air interface with features enabling support of AI/ML-based algorithms for enhanced performance and/or reduced complexity/overhead. This SI's target was to lay the foundation for future air-interface use cases leveraging AI/ML techniques. The initial set of use cases to be covered include CSI feedback enhancement (e.g., overhead reduction, improved accuracy, prediction), beam management (e.g., beam prediction in time, and/or spatial domain for overhead and latency reduction, beam selection accuracy improvement), and positioning accuracy enhancements.

The scope of the WID has been specified at the December 2022 RAN plenary:

Sub-use cases supported in RAN1 are,
   CSI compression - using a two-sided AI model
   Time domain CSI prediction - only for UE-sided model. RAN1 agreed to defer discussion on potential specification impact until RAN1#112b-e
   Spatial-domain DL beam prediction (BM-Case1)
   Temporal DL beam prediction (BM-Case2)
   Direct AI/ML positioning
   AI/ML-assisted positioning To proceed with the WI, a major target remains to:

Assess potential specification impact, specifically for the agreed use cases in the final representative set and for a common framework:
   PHY layer aspects, e.g., (RAN1)
     Consider aspects related to, e.g., the potential specification of the AI Model lifecycle management, and dataset construction for training, validation, and test for the selected use cases
   Use case and collaboration level specific specification impact, such as new signaling, means for training and validation data assistance, assistance information, measurement, and feedback
   Protocol aspects, e.g., (RAN2) - RAN2 only starts the work after there is sufficient progress on the use case study in RAN1
     Consider aspects related to, e.g., capability indication, configuration and control procedures (training/inference), and management of data and AI/ML model, per RAN1 input
   Collaboration level specific specification impact per use case Note that definitions for direct versus assisted positioning and collaboration levels have been defined during RAN1-109-e:

Agreement
Companies are encouraged to provide evaluation results for:
   Direct AI/ML positioning
     Companies are encouraged to describe at least the following implementation details for the evaluation
        details of the channel observation used as the input of the AI/ML model inference (e.g., type and size of model input), model input acquisition and pre-processing
   AI/ML assisted positioning
     Companies are encouraged to describe at least the following implementation details for the evaluation
        details of the channel observation used as the input of the AI/ML model inference (e.g., type and size of model input), model input acquisition and pre-processing
        details of the output of the AI/ML model inference, how the AI/ML model output is used to obtain the UE's location
Agreement
Companies are encouraged to study and provide inputs on potential specification impact at least for the following aspects of AI/ML approaches for sub use cases of AI/ML for positioning accuracy enhancement.
   AI/ML model training
     training data type/size
     training data source determination (e.g., UE/PRU/TRP)
     assistance signalling and procedure for training data collection
   AI/ML model indication/configuration
     assistance signalling and procedure (e.g., for model configuration, model activation/deactivation, model recovery/termination, model selection)
   AI/ML model monitoring and update
     assistance signalling and procedure (e.g., for model performance monitoring, model update/tuning)
   AI/ML model inference input
     report/feedback of model input for inference (e.g., UE feedback as input for network side model inference)
     model input acquisition and pre-processing
     type/definition of model input
   AI/ML model inference output
     report/feedback of model inference output
     post-processing of model inference output
   UE capability for AI/ML model(s) (e.g., for model training, model inference and model monitoring)
   Other aspects are not precluded
   Note: not all aspects may apply to an AI/ML approach in a sub use case
   Note2: the definitions of common AI/ML model terminologies are to be discussed in agenda 9.2.1

In NR positioning, a positioning transmitter/receiver is required to be capable of transmitting/receiving positioning signals on n aggregated carriers, n<=N (N=3 in Rel. 18 with possibility to extend to more in further releases).

The n-th aggregated carrier may contain a positioning signal [TS 38.211 sections 6.4 and 7.4] which (1-3 immediately following):

1. Occupies a variable bandwidth, always an integer multiple of 4 PRBs, where the minimum BW is 4 PRBs and the maximum is 272 PRBs. In other words, the signal can occupy a BW=4×PRBs, where X=1:68 and a PRB contains P=12 subcarriers.

2. Occupies a variable number of symbols i.e. the positioning signal can be $L_{PRS}$ OFDM symbols long, where $L_{PRS}$ takes any value in the set $\{2, 4, 6, 12\}$.

3. Occupies a variable number of subcarriers in each BW, according to the comb setting. The comb $K_{comb}^{PRS}$ can take any value in the set C=$\{2, 4, 6, 12\}$, where comb $K_{comb}^{PRS}$ signifies that every $K_{comb}^{PRS}$-th carrier contain a positioning sample.

Note that all the combinations of $L_{PRS}$ and comb $K_{comb}^{PRS}$ may not be allowed in some settings. The combination $\{L_{PRS}, K_{comb}^{PRS}\}$ is at least one of $\{2, 2\}$, $\{4, 2\}$, $\{6, 2\}$, $\{12, 2\}$, $\{4, 4\}$, $\{12, 4\}$, $\{6, 6\}$, $\{12, 6\}$ and $\{12, 12\}$.

Figure 2:
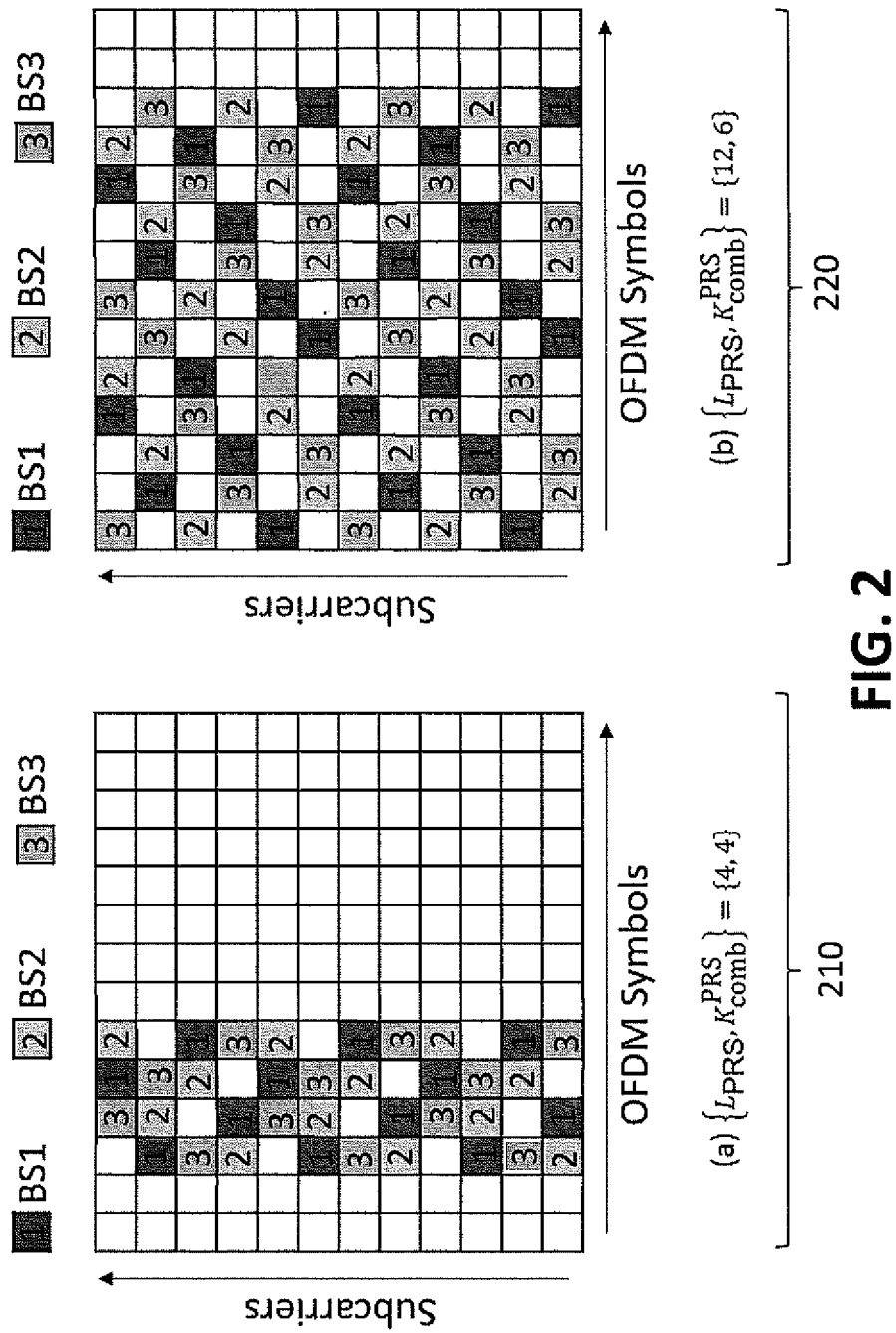
FIG. 2 depicts two examples of $\{L_{PRS}, K_{comb}^{PRS}\}$ configurations for PRS resources in a PRB, where the position and number of the allocated REs are different.

FIG. 2 depicts two examples of $\{L_{PRS}, K_{comb}^{PRS}\}$ configurations, namely $\{4, 4\}$ 210 and $\{12, 6\}$ 220, for PRS resources in a PRB. The position and number of the allocated REs are different.

To conclude, a positioning signal can occupy various number of resource elements (REs) between 8=(4×12)/12×2 (for the configuration with n=1, BW=4 PRB, $L_{PRS}$=2, and $K_{comb}^{PRS}$=12) and 19584=3×(4×12×68)/2×12 (for the configuration with n=3, BW=4×68 PRB, $L_{PRS}$=12, and $K_{comb}^{PRS}$=6), where these REs can be spread over the duration of 2 to 12 OFDM symbols, therefore, a positioning receiver may receive throughout consecutive positioning sessions, signals with a variable number of aggregated carriers, a variable bandwidth per carrier and variable duration.

Such positioning receiver should be able to extract the required positioning measurements and/or location estimates regardless of the size of the received signal. Otherwise put, a positioning receiver which uses AI/ML-direct/assisted positioning to accomplish this task, must ensure that the input to the AI/ML block is of fixed size and shape, regardless of the size and shape of the received positioning signal (that is because the AI/ML module is trained with a fixed type and shape of input).

Figure 3:
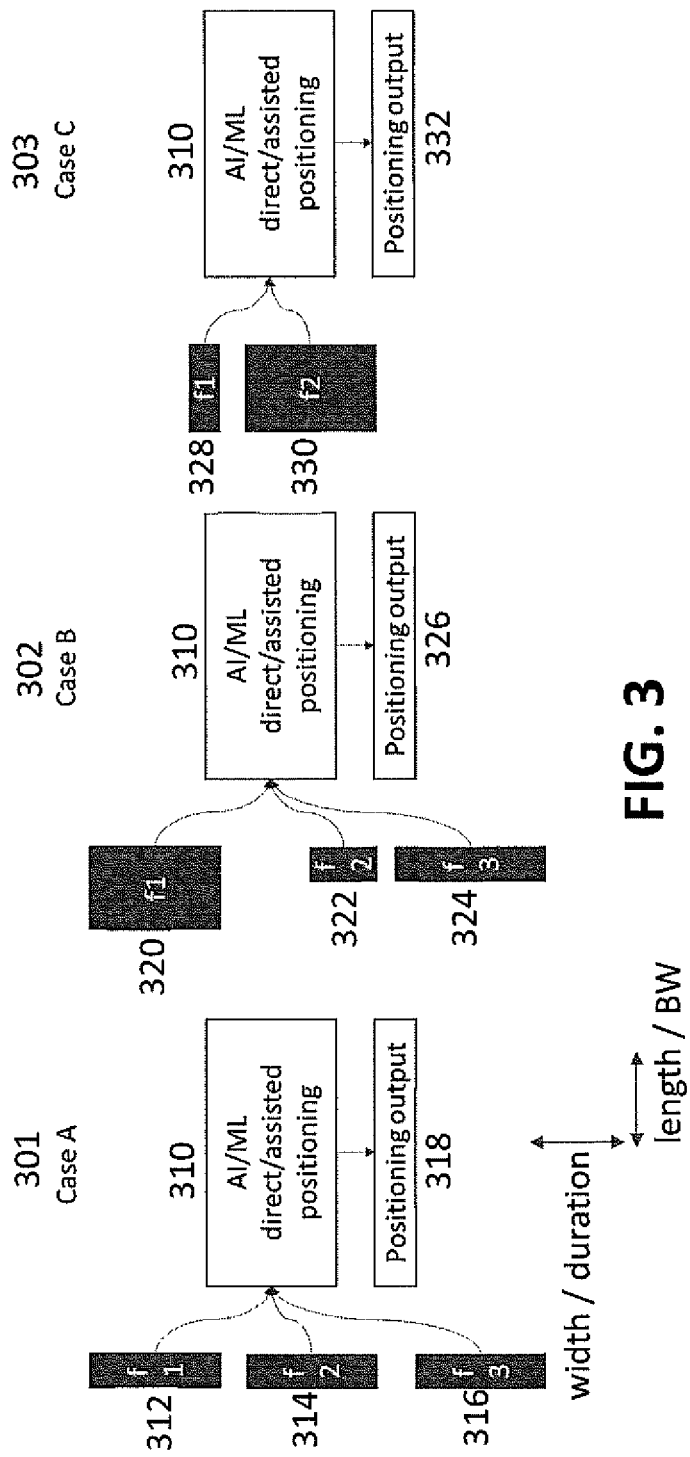
FIG. 3 shows positioning signals with different BW and durations received by the same AI/ML module.

In sum, referring to FIG. 3, the AI/ML positioning block 310 should be able to produce a positioning output (318, 326, 332) when fed any positioning signal (with variable BW and duration) generated under the standard parameterization 1-3 (i.e. case A 301, case B 302, case C 303) as shown in FIG. 3. How to enable this is not a straightforward task, since it requires bringing the received signals to a common format (bandwidth-, duration- and carrier-agnostic), with minimal loss of information about the channel conditions that each signal experiences.

In FIG. 3, the BW of the positioning signal is given by the length of the block, and the duration by the width. For case A 301, the signals (312, 314, 316) have the same BW and the same duration. For case B 302, the positioning signals (320, 322, 324) have different durations, while positioning signals 322 and 324 have the same BW that differs from the BW of positioning signal 320. For case C 303, positioning signals 328 and 330 have the same bandwidth but different durations. Also, signals 312, 320, and 328 are provided on carrier frequency f1, signals 314, 322, and 330 are provided on carrier frequency f2, and signals 316 and 324 are provided on carrier frequency f3.

The examples described herein provide a standard framework to ensure that the AI/ML model remains agnostic to the size and shape of the input data, which standard framework is provided and described herein in addition to addressing potential specification impact related to AI input pre-processing, and to type of input, acquisition of input and pre-processing.

Figure 4:
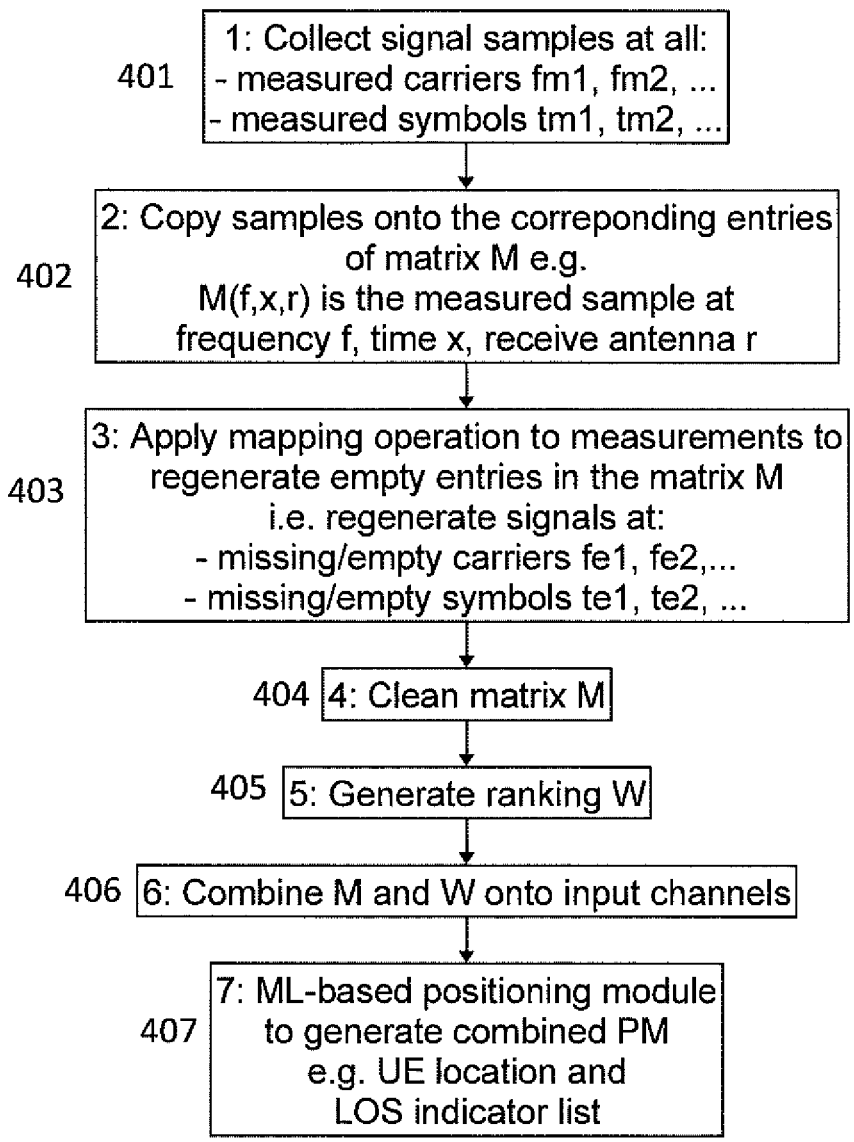
FIG. 4 shows a proposed positioning architecture.

Referring to FIG. 4, described herein an AIML-based positioning receiver architecture that is agnostic to the bands, number of aggregated carriers and resolution of the received positioning signals. In other words, the architecture shown in FIG. 4 is able to:

1 (401). Collect, store and modify positioning signals samples received on a variable number of carrier frequencies and of variable durations.

2 (402). Convert/post-process the samples to a common data format M. For example, M may be a matrix, whose entry M(f, x, r, t) stores the sample collected for signal source t, by receive antenna r, at frequency f, time x.

3 (403). Regenerate the missing entries of the common data format M obtained in 2 (402) using a mapping that accounts for: i) the frequency, time and space selectivity of the channel response, and ii) the ID of the transmitter using some or all of the measured resources.

4 (404). Clean final data matrix M.

5 (405). Rank the different entries to the common format according to at least the measurement: a) type i.e. real or regenerated, or b) noise/interference level: high/medium/low, etc.

6 (406). Generate the input to the ML-based positioning module as the combination between the data obtained in step 2 (402) and step 3 (403), and the ranking obtained in step 5 (405).

7 (407). Use the input obtained in step 6 (405) in an ML-based positioning module that computes combined positioning measurements (PMs) e.g., estimates the UE location, and/or LOS per signal source, and/or AOA per signal source, and/or multipath measurements including path gain and delay. A) For example, in one embodiment, the module output may be PM=(x, y, z) designating the 3D UE location. B) In another embodiment, the module output may be: PM=[LOS to source 1, . . . , LOS to source X], etc. C) In another embodiment the module output may be a combination of A and B.

To train such a module, a new combined loss function of the MSE of the UE location and cross entropy (CE) for the LOS may be used.

Each step of FIG. 4 is explained with more details and description as follows.

Step 1 (401): Consider a 2D resource grid with K subcarriers and L OFDM symbols. According to the configured BW, comb, and number of OFDM symbols, the PRS is collected at the receiver from all the T BSs. $KL^t$ represents the set of tuples belong to the PRS resource of the t-th BS. If the resource element (k,l) is configured to the t-th BS PRS resource ((k,l)$\in KL^t$), the received signal at the r-th receive antenna can be written as $$y_{k,l}^{(r)} = h_{k,l}^{(r,t)} x_{k,l}^{(t)} + w_{k,l}^{(r)}$$

where $x_{k,l}^{(t)}$, $h_{k,l}^{(r,t)}$, and $w_{k,l}^{(r)}$ denote the transmitted signal by the t-th BS, the channel between the t-th BS and r-th receive antenna, and the received complex Gaussian noise with variance $\sigma_W^2$ at resource element (k,l), respectively.

Step 2 (402): Consider matrix $M^{(t)}$ a 3D resource grid with K subcarriers, L OFDM symbols, and R receive antennas for the t-th BS PRS resource. The entries of $M^{(t)}$ which are members of the set $KL^t$, i.e. $(k,l) \in KL^t$, can be filled with the measured PRS signal as $M^{(t)}(k,l,r)=y_{k,l}^{(r)}$. Of course, some of the entries of M are not assigned to the t-th PRS resources, so they can be filled with zero ($M^{(t)}(k,l,r)=0$). In addition, another 3D matrix $B^{(t)}$ can be defined to determine the status of resource elements. Thus, $B^{(t)}(k,l,r)=1$ if the RE (k,l) is allocated to the t-th BS PRS resource, otherwise $B^{(t)}(k,l,r)=0$. A similar matrix can be defined as $X^{(t)}(k,l)=x_{k,l}^{(t)}$ where $(k,l) \in KL^t$, otherwise $X^{(t)}(k,l)=0$.

Step 3 (403): The role of function f( ) is to construct the desired input of AI/ML positioning module 310 using the PRS measured signal. Thus, it is likely that some of the resource elements in the desired shape need to be interpolated. Although the simplest way of obtaining an ML input with the desired shape is to use a zero-padding technique, it may lead to performance loss due to synthetically added elements that do not match with the expected correlation between resource elements. The interpolation functionality may depend on the propagation properties of the environment, e.g., the function f( ) may use the time-frequency correlation information for interpolating the missing resource elements. The function f( ) is a way to feed environment-specific information to AI/ML solutions, which may be trained in a way to be generic to different environment/scenarios.

In some examples, FIG. 2 illustrates the input and possible labels for interpolation function f( ). The details of inputs and labels depend on the considered configuration for the positioning module.

In case of difference between the configurations of the received PRS and trained ML-based positioning unit, two tasks can be defined to provide the interpolated PRS signal required for ML-based positioning. The first task is to estimate the channel between each BS and receive antenna at all the REs in the resource frequency-time grid. The second task is to generate PRS signals based on the estimated channels.

Various methods can be used for the channel estimation task. Described herein are two methods: estimation theory-based and ML-based regression functions. If the channel estimations are already available at all the REs, this stage may be skipped.

(a) Estimation Theory: Consider $P^{(t)}$ as the set of indices of REs that are assigned for the t-th BS PRS resource. Thus, $$y_{P^{(t)}}^{(r)} = h_{P^{(t)}}^{(r,t)} \odot x_{P^{(t)}}^{(t)} + w_{P^{(t)}}^{(r)}$$

where $\odot$ denotes the element-wise product. Also, $y_{P^{(t)}}^{(r)}$ is the received signal vector at the r-th receive antenna for all the REs in $P^{(t)}$. The linear minimum mean-squared error (LMMSE) estimation can be chosen to estimate the PRS signal at the unmeasured REs. The LMMSE estimate $\hat{\mu}_{h^{(r,t)}}$ of $h^{(r,t)}$ given the observation $y_{P^{(t)}}^{(r)}$.

$$\hat{\mu}_{h^{(r,t)}} = C_{h^{(r,t)} h_{P^{(t)}}^{(r,t)}} \left( C_{h_{P^{(t)}}^{(r,t)}} + \sigma_W^2 I \right)^{-1} \left( (x_{P^{(t)}}^{(t)})^* \odot y_{P^{(t)}}^{(r)} \right)$$

In addition, the corresponding error covariance can be written as $$\hat{C}_{h^{(r,t)}} = C_{h^{(r,t)}} - C_{h^{(r,t)} h_{P^{(t)}}^{(r,t)}} \left( C_{h_{P^{(t)}}^{(r,t)}} + \sigma_W^2 I \right)^{-1} C_{h^{(r,t)} h_{P^{(t)}}^{(r,t)}}^H$$

where $C_{h^{(r,t)}}$ and $$C_{h_{P^{(t)}}^{(r,t)}}$$

respectively are the covariance matrices of $h^{(r,t)}$ and $h_{P^{(t)}}^{(r,t)}$. Also, $$C_{h^{(r,t)} h_{P^{(t)}}^{(r,t)}}$$

is built from the columns of $C_{h^{(r,t)}}$ indexed by $P^{(t)}$. The 3D matrix $H^{(t)}$ may be constructed for storing the channel between the t-th BS and receive antennas at all the REs.

(b) ML-based: Also, an ML-based model can be trained to provide interpolation for the missing resource elements. The inputs of the ML-based estimator are the matrices $M^{(t)}$, $B^{(t)}$, and $X^{(t)}$. The ML estimator results matrix $H^{(t)}$ as estimates of the channel between the t-th BS and all the receive antennas at all the REs. Various structures can be considered for the ML model including a fully connected neural network (FCNN), a convolutional neural network (CNN), and transformers (TF).

Figure 5:
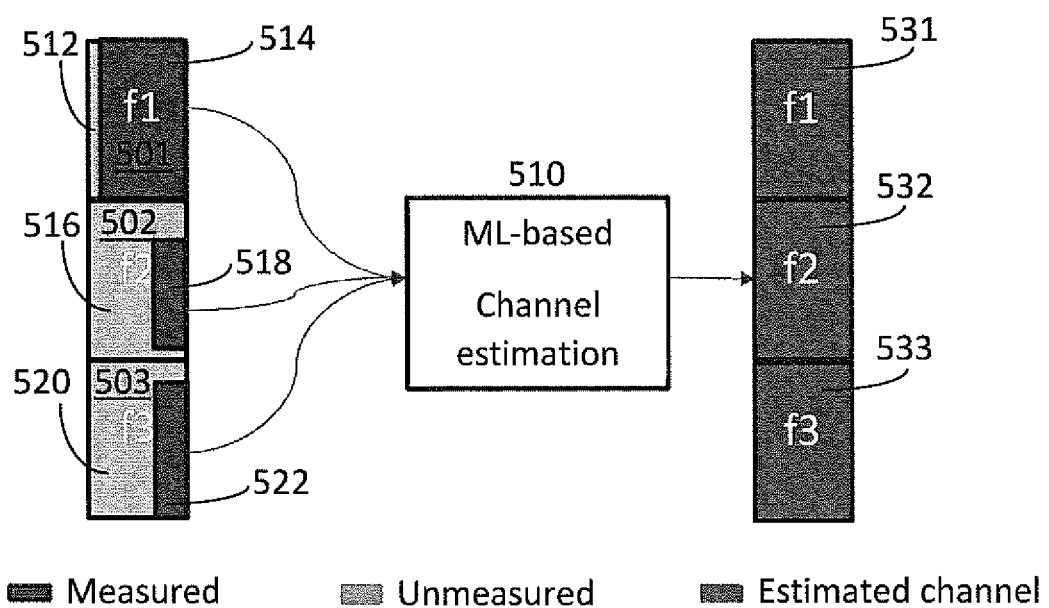
FIG. 5 depicts ML-based channel estimation.

Thus, referring to FIG. 5, ML-based channel estimation 510 takes as input signal 501 (having unmeasured portion 512 and measured portion 514) on carrier frequency f1, signal 502 (having unmeasured portion 516 and measured portion 518) on carrier frequency f2, and signal 503 (having unmeasured portion 520 and measured portion 522) on carrier frequency f3, and produces as output estimated signals 531, 532, and 533, where estimated signal 531 is with frequency f1, signal 532 is with frequency f2, and signal 533 is with frequency f3.

Data collection is a fundamental step of training an accurate ML-based interpolation function. To collect the training dataset, a set of one or more PRS configurations (BW, comb, and number of OFDM symbols) needs to be considered and collected are the received PRS signals by all the receive antennas. Mean squared error (MSE) may be used as the loss function of the channel estimation network. The label of each training sample is the true channel, which can be collected by sensing the full resource block with pilots (e.g., channel sounding with CSI-RS) in adjacent time slots.

After estimating the channel responses, the PRS signal may be interpolated (reconstructed) with a different configuration. Consider $O^{(t)}$ as the interpolated matrix with the same dimension as matrix $M^{(t)}$, where the PRS resources are adapted to the new configuration that the ML-based positioning needs. Based on the estimated channel responses in the previous task, the desired PRS signal can be constructed for the ML-based positioning unit. First, the PRS sequence $\hat{x}_{k,l}^{(t)}$ may be regenerated according to the new configuration, and the received signal $\hat{y}_{k,l}^{(r)}$ may be simulated as $$\hat{y}_{k,l}^{(r)} = \tilde{h}_{k,l}^{(r,t)} \hat{x}_{k,l}^{(t)}$$

where $\tilde{h}_{k,l}^{(r,t)}$ is the estimated channel at RE(k,l). The entries of matrix $O^{(t)}$ can be filled with the simulated received signal $\hat{y}_{k,l}^{(r)}$. Therefore, the matrix is compatible with the PRS configuration of the ML-based positioning unit.

Step 4 (404): The reconstructed matrices $O^{(t)}$, t=1, 2, ..., T need to be combined according to the PRS resources for each BS. Thus, the (k,l,r) entry of the new matrix $\hat{M}$ is $\hat{M}(k,l,r)=O^{(t)}(k,l,r)$, if $(k,l) \in KL^t$ and if a RE is not assigned to any PRS resources, it can be filled with zero. If there would be any abnormality e.g. in the range of PRS values, those entries may be cut or set to zeros. Then, according to the positioning ML model input size and shape, matrix $\hat{M}$ is cleaned by discarding some entries and/or reshaping to a specific size that the ML model is trained. The cleaning procedure varies over different positioning receivers, as various ML models can be considered by different gNB/UE vendors.

Step 5 (405): The weight ranking matrix W determines the reliability of measurements in different carriers. Also, the weight ranking matrix W may contain historical information with respect to the success/failure of providing accurate information in previous experiments. Thus, the weight list relies more on some carriers that resulted in higher positioning accuracy. In addition, the weight ranking matrix W may implicitly indicate the current level of interference caused by other nodes at different aggregated carriers. If W is provided by the LMF, the receiver may use the ranking directly, or apply some modifications on the ranking list and prepare it for feeding to the ML-based positioning unit 310. For example, the receiver may consider spacing information between antenna elements to modify W or reshape the matrix into the desired size. Another possibility for generating ranking matrix W is to consider equal weighting for all the carriers/REs. Another alternative for W is to weight more the measured carriers/REs compared to the interpolated ones.

Figure 6:
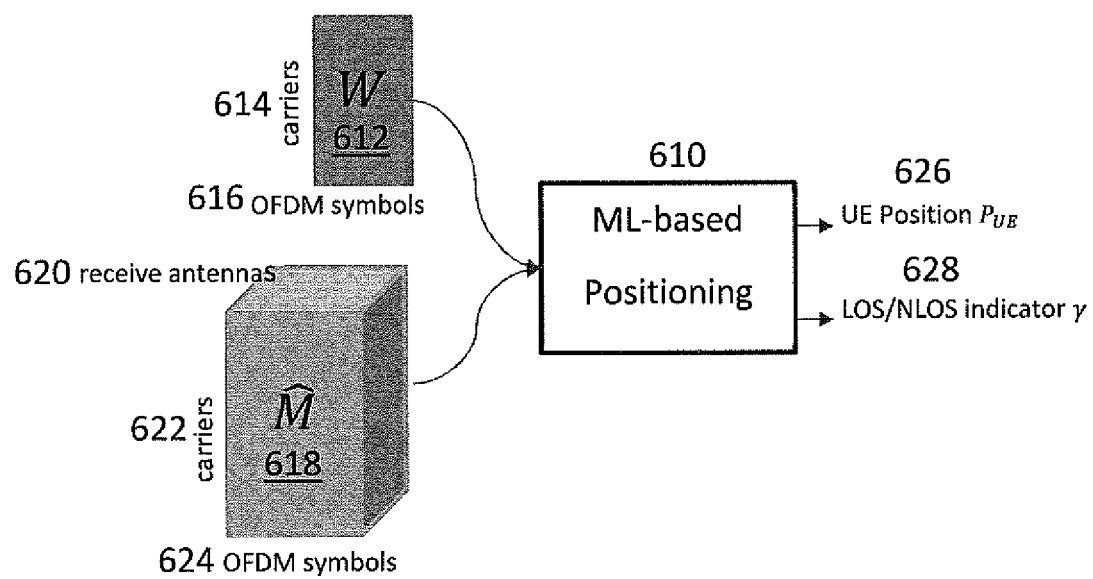
FIG. 6 depicts an ML-enabled multi-task positioning unit for direct positioning and LOS/NLOS detection, showing the weighting matrix W influence on the ML outputs by weighting more some of the carriers.

Step 6 (406) & 7 (407): Referring to FIG. 6, an ML-based positioning unit 610 can be trained by the receiver, where it requires PRS signals from several BSs with a specific (fixed) PRS configuration. In this case, during an inference phase, the interpolated matrix $\hat{M}$ (618) and the weighting ranking matrix W (612) are fed to the positioning unit 610, and a direct 2D/3D position $P_{UE}$ (626) and/or LOS/NLOS indicator $\gamma$ (628) can be the outputs of the positioning model 610. Note that the LOS indicator (628) can also be a vector, with entries for LOS/NLOS condition for all gNBs. The ML positioning model 610 may include several layers including FCNNs, CNNs, TFs, etc.

As shown in FIG. 6, the ranking matrix W (612) comprises carriers across one dimension (614) and OFDM symbols across another dimension (616) and the interpolated matrix $\hat{M}$ (618) comprises one or more receive antennas across a first dimension (620), carriers across a second dimension (622), and OFDM symbols across a third dimension (624).

For training the multi-task positioning model 610, a combined loss function of the MSE and cross entropy (CE) may be used or implemented as:

$$L = L_{MSE} + \sum_{t=1}^{T} L_{CE}^{(t)}$$

$$L_{MSE} = \|P_{UE} - P_{UE}^L\|^2$$

$$L_{CE}^{(t)} = -\gamma_t^L \log \gamma_t - (1 - \gamma_t^L) \log(1 - \gamma_t)$$

where $P_{UE}^L$ and $\gamma_t^L$ denote the labels for UE position and the LOS/NLOS indicator for the t-th gNB, respectively. UE vendors may use PRU or GNSS positioning sources for collecting training samples, and consequently recording LOS/NLOS condition based on the UE and BSs positions. Moreover, the training dataset can be collected with different SNRs in a range, where the length of the SNR range may be considered as one of the hyper-parameter of the ML-enabled positioning unit.

An example training dataset used for training the ML-based positioning module 610 is depicted in the table below.

| Sample | ML model Inputs | | ML model Label UE position |
|---|---|---|---|
| | Reconstructed PRS signal with the considered configuration | Weight list | |
| 1 | $\hat{M}^{(1)}$ | $W^{(1)}$ | $(x, y, z)^{(1)}$ |
| 2 | $\hat{M}^{(2)}$ | $W^{(2)}$ | $(x, y, z)^{(2)}$ |
| 3 | $\hat{M}^{(3)}$ | $W^{(3)}$ | $(x, y, z)^{(3)}$ |
| ... | ... | ... | ... |
| N | $\hat{M}^{(N)}$ | $W^{(N)}$ | $(x, y, z)^{(N)}$ |

In this example, the "UE position" is considered as the outcome of the ML positioning module 610.

The UE may use a sanity check mechanism to verify the positioning outputs. If there would be a problem with the positioning outputs, UE 110 may modify the weighting matrix W (612) and execute the ML-based positioning (step 6&7 (406 and 407)) again. The UE 110 may share the modified weighting matrix W (612) with the LMF.

The examples described herein may be applicable to the framework of Rel. 18 WID on the expanded and improved NR positioning [RP-223549] and on AI/ML for air interface [RP-223494].

It is possible test the usage of the herein described framework by a lab setup in which the device under test (DUT) is provided an intentionally manipulated interpolation function f( ) or weighting matrix W, and otherwise high SNR conditions, to check performance degradation of the positioning reports.

Besides considering random options for manipulating function f( ) and weighting matrix W, options may be considered that consider fully correlated correlation matrices (correlation coefficient=−1) with the true channel correlation matrix or the true weighting list. In this situation, the DUT should exhibit severe performance degradation in either the location estimate output or the LOS detection, in spite of operating in good SNR conditions.

Figure 7:
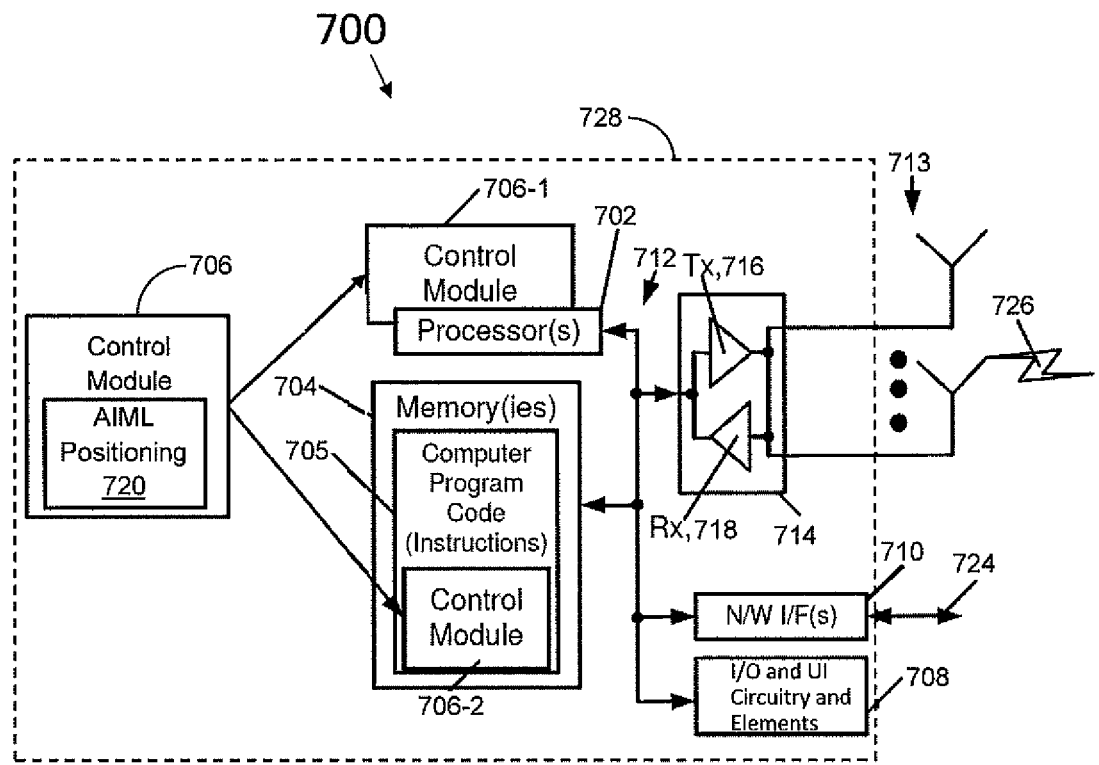
FIG. 7 is an example apparatus configured to implement the examples described herein.

FIG. 7 is an example apparatus 700, which may be implemented in hardware, configured to implement the examples described herein. The apparatus 700 comprises one or more one processors 702 (e.g. an FPGA and/or CPU), one or more memories memory 704 including computer program code 705, the computer program code 705 having instructions to carry out the methods described herein, wherein the at least one memory 704 and the computer program code 705 are configured to, with the at least one processor 702, cause the apparatus 700 to implement circuitry, a process, component, module, or function (implemented with control module 706 having AIML positioning 720) to implement the examples described herein, including an AIML positioning receiver for flexible carrier aggregation. The memory 704 may be a non-transitory memory, a transitory memory, a volatile memory (e.g. RAM), or a non-volatile memory (e.g. ROM).

The apparatus 700 includes a display and/or I/O interface 708 that may be used to display aspects or a status of the methods described herein (e.g., as one of the methods is being performed or at a subsequent time), or to receive input from a user such as with using a keypad, camera, touchscreen, touch area, receive area, microphone, biometric recognition, one or more sensors, etc. Thus interface 708 includes user interface (UI) circuitry and elements. The apparatus 700 includes one or more communication e.g. network (N/W) interfaces (I/F(s)) 710. The communication I/F(s) 710 may be wired and/or wireless and communicate over the Internet/other network(s) via any communication technique via one or more links 724. The link(s) 724 may be the link(s) 131 and/or 176 from FIG. 1. The link(s) 131 and/or 176 from FIG. 1 may also be implemented using transceiver(s) 714 and corresponding wireless link(s) 726. The communication I/F(s) 710 may comprise one or more transmitters or one or more receivers.

The transceiver 714 comprises one or more transmitters 716 and one or more receivers 718. The transceiver 716 and/or communication I/F(s) 710 may comprise standard well-known components such as an amplifier, filter, frequency-converter, (de)modulator, and encoder/decoder circuitries and one or more antennas, such as antennas 713 used for communication over wireless link 726.

The control module 706 of the apparatus 700 comprises one of or both parts 706-1 and/or 706-2, which may be implemented in a number of ways. The control module 706 may be implemented in hardware as control module 706-1, such as being implemented as part of the one or more processors 702. The control module 706-1 may be implemented also as an integrated circuit or through other hardware such as a programmable gate array. In another example, the control module 706 may be implemented as control module 706-2, which is implemented as computer program code (having corresponding instructions) 705 and is executed by the one or more processors 702. For instance, the one or more memories 704 store instructions that, when executed by the one or more processors 702, cause the apparatus 700 to perform one or more of the operations as described herein. Furthermore, the one or more processors 702, one or more memories 704, and example algorithms (e.g., as flowcharts and/or signaling diagrams), encoded as instructions, programs, or code, are means for causing performance of the operations described herein.

The apparatus 700 to implement the functionality of control module 706 including AIML positioning 720 may be UE 110, RAN node 170 (e.g. gNB), or network element(s) 190. Thus, processor(s) 702 may correspond to processor(s) 120, processor(s) 152 and/or processor(s) 175, one or more memories 704 may correspond to one or more memories 125, one or more memories 155 and/or one or more memories 171, computer program code 705 may correspond to computer program code 123, computer program code 153, and/or computer program code 173, and control module 706 including AIML positioning 720 may correspond to module 140-1, module 140-2, module 150-1, and/or module 150-2.

Communication I/F(s) 710 may correspond to transceiver 130 (including Tx 133 and Rx 132), antenna(s) 128, transceiver 160 (including Tx 163 and Rx 162), antenna(s) 158, transceiver 197 (including Tx 198 and Rx 199), N/W I/F(s) 161, and/or N/W I/F(s) 180. Thus Tx 716 may correspond to Tx 133, Tx 163, or Tx 198, and Rx 718 may correspond to Rx 132, Rx 162 or Rx 199. Transceiver 714 may correspond to transceiver 130 (including Tx 133 and Rx 132), antenna(s) 128, transceiver 160 (including Tx 163 and Rx 162), antenna(s) 158, transceiver 197 (including Tx 198 and Rx 199), N/W I/F(s) 161, and/or N/W I/F(s) 180. Thus Tx 716 may correspond to Tx 133, Tx 163, or Tx 198, and Rx 718 may correspond to Rx 132, Rx 162 or Rx 199.

Alternatively, apparatus 700 and its elements may not correspond to either of UE 110, RAN node 170, or network element(s) 190 and their respective elements, as apparatus 700 may be part of a self-organizing/optimizing network (SON) node or other node, such as a node in a cloud.

The apparatus 700 may also be distributed throughout the network (e.g. 100) including within and between apparatus 700 and any network element (such as a network control element (NCH) 190 and/or the RAN node 170 and/or the UE 110).

Interface 712 enables data communication between the various items of apparatus 700, as shown in FIG. 7. For example, the interface 712 may be one or more buses such as address, data, or control buses, and may include any interconnection mechanism, such as a series of lines on a motherboard or integrated circuit, fiber optics or other optical communication equipment, and the like. Computer program code (e.g. instructions) 705, including control 706 may comprise object-oriented software configured to pass data or messages between objects within computer program code 705. The apparatus 700 need not comprise each of the features mentioned, or may comprise other features as well. The various components of apparatus 700 may at least partially reside in a common housing 728, or a subset of the various components of apparatus 700 may at least partially be located in different housings, which different housings may include housing 728.

The communication I/F 710 or transceiver 714 including Rx 718, together with AIML positioning 720 and processor 702 may implement the examples described herein, namely an AIML positioning receiver for flexible carrier aggregation.

Figure 8:
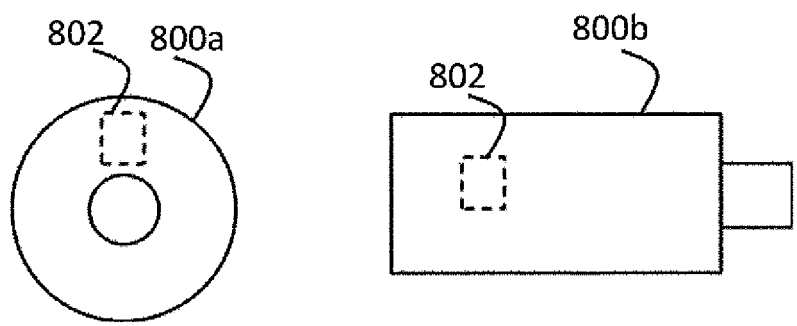
FIG. 8 shows a representation of an example of non-volatile memory media.

FIG. 8 shows a schematic representation of non-volatile memory media 800*a* (e.g. computer/compact disc (CD) or digital versatile disc (DVD)) and 800*b* (e.g. universal serial bus (USB) memory stick) storing instructions and/or parameters 802 which when executed by a processor allows the processor to perform one or more of the steps of the methods described herein.

Figure 9:
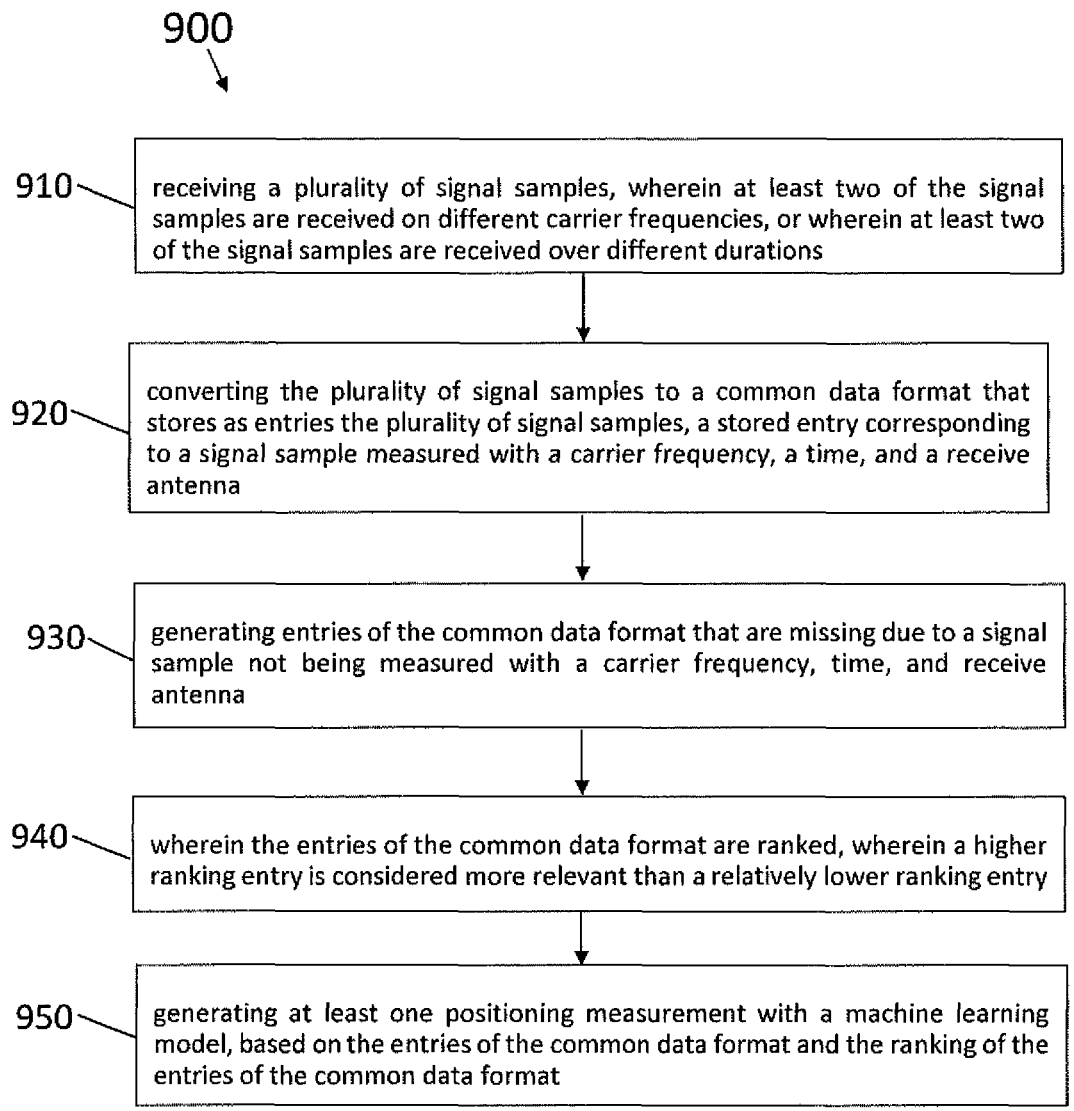
FIG. 9 is an example method implementing the examples described herein.

FIG. 9 is an example method 900 to implement the example embodiments described herein. At 910, the method includes receiving a plurality of signal samples, wherein at least two of the signal samples are received on different carrier frequencies, or wherein at least two of the signal samples are received over different durations. At 920, the method includes converting the plurality of signal samples to a common data format that stores as entries the plurality of signal samples, a stored entry corresponding to a signal sample measured with a carrier frequency, a time, and a receive antenna. At 930, the method includes generating entries of the common data format that are missing due to a signal sample not being measured with a carrier frequency, time, and receive antenna. At 940, the method includes wherein the entries of the common data format are ranked, wherein a higher ranking entry is considered more relevant than a relatively lower ranking entry. At 950, the method includes generating at least one positioning measurement with a machine learning model, based on the entries of the common data format and the ranking of the entries of the common data format. Method 900 may be performed with UE 100, RAN node 170, one or more network elements 190, or apparatus 700.

Figure 10:
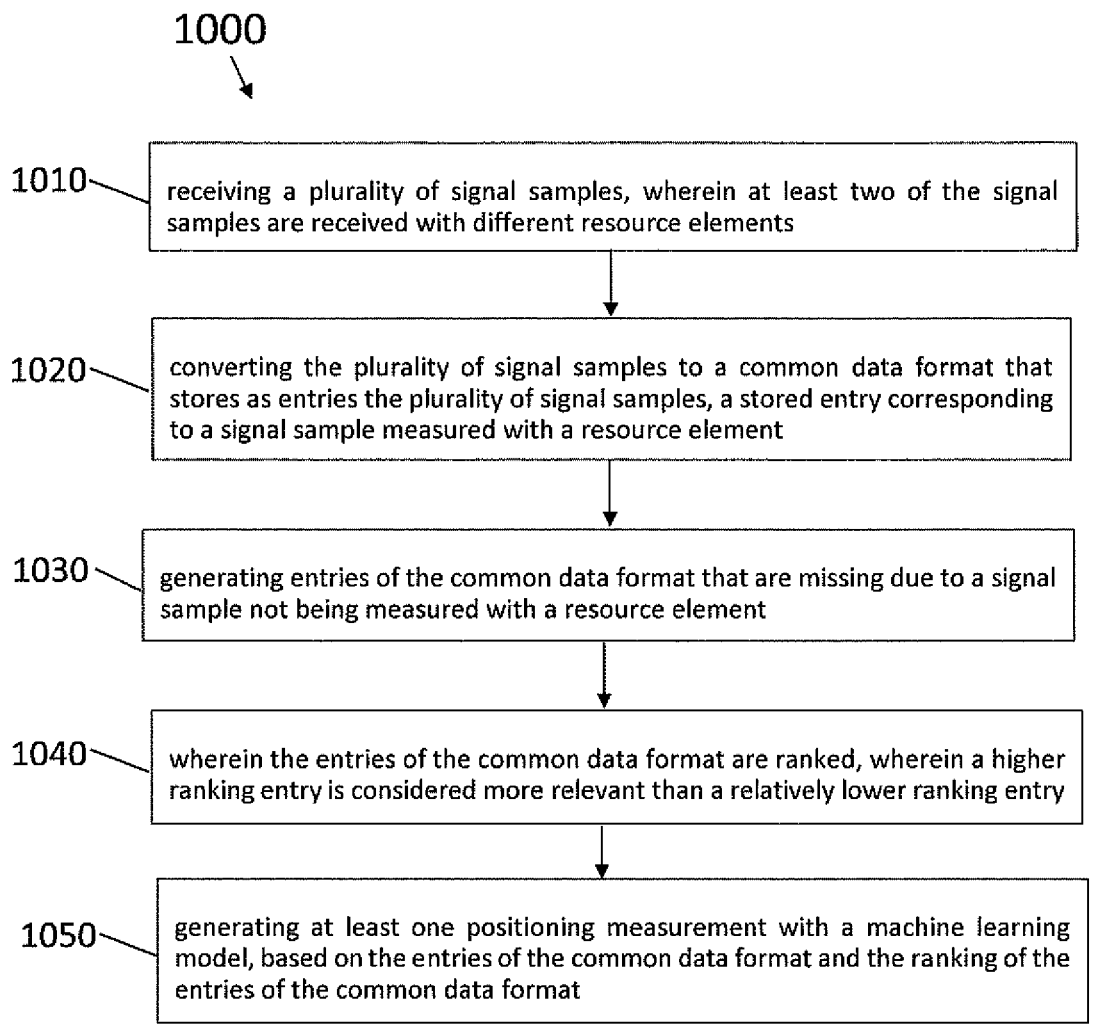
FIG. 10 is an example method implementing the examples described herein.

FIG. 10 is an example method 1000 to implement the example embodiments described herein. At 1010, the method includes receiving a plurality of signal samples, wherein at least two of the signal samples are received with different resource elements. At 1020, the method includes converting the plurality of signal samples to a common data format that stores as entries the plurality of signal samples, a stored entry corresponding to a signal sample measured with a resource element. At 1030, the method includes generating entries of the common data format that are missing due to a signal sample not being measured with a resource element. At 1040, the method includes wherein the entries of the common data format are ranked, wherein a higher ranking entry is considered more relevant than a relatively lower ranking entry. At 1050, the method includes generating at least one positioning measurement with a machine learning model, based on the entries of the common data format and the ranking of the entries of the common data format. Method 1000 may be performed with UE 100, RAN node 170, one or more network elements 190, or apparatus 700.

The following embodiments are provided and described herein.

Embodiment 1. An apparatus including: at least one processor; and at least one memory storing instructions that, when executed by the at least one processor, cause the apparatus at least to: receive a plurality of signal samples, wherein at least two of the signal samples are received on different carrier frequencies, or wherein at least two of the signal samples are received over different durations; convert the plurality of signal samples to a common data format that stores as entries the plurality of signal samples, a stored entry corresponding to a signal sample measured with a carrier frequency, a time, and a receive antenna; generate entries of the common data format that are missing due to a signal sample not being measured with a carrier frequency, time, and receive antenna; wherein the entries of the common data format are ranked, wherein a higher ranking entry is considered more relevant than a relatively lower ranking entry; and generate at least one positioning measurement with a machine learning model, based on the entries of the common data format and the ranking of the entries of the common data format.

Embodiment 2. The apparatus of embodiment 1, wherein a duration corresponds to at least one of: a range of radio symbols, or a time associated with a respective radio symbol.

Embodiment 3. The apparatus of embodiment 2, wherein a radio symbol comprises an orthogonal frequency division multiplexing symbol.

Embodiment 4. The apparatus of any of embodiments 1 to 3, wherein a stored entry corresponds to a resource element associated with a respective signal sample, the resource element comprising one subcarrier in a frequency domain and one orthogonal frequency division multiplexing symbol in a time domain.

Embodiment 5. The apparatus of any of embodiments 1 to 4, wherein a stored entry further corresponds to a source of one of the received signal samples.

Embodiment 6. The apparatus of any of embodiments 1 to 5, wherein the common data format comprises a matrix.

Embodiment 7. The apparatus of any of embodiments 1 to 6, wherein a stored entry of the common data format corresponds to an orthogonal frequency division multiplexing symbol.

Embodiment 8. The apparatus of any of embodiments 1 to 7, wherein the instructions, when executed by the at least one processor, cause the apparatus at least to: generate the entries of the common data format that are missing with accounting for: a frequency, time, and space selectivity of a channel response; and an identifier of a transmitter of the signal samples.

Embodiment 9. The apparatus of any of embodiments 4 to 8, wherein a respective one of the entries that is missing corresponds to a resource element for which a signal sample was not collected.

Embodiment 10. The apparatus of any of embodiments 1 to 9, wherein the instructions, when executed by the at least one processor, cause the apparatus at least to: generate the entries of the common data format that are missing with interpolating between the stored entries.

Embodiment 11. The apparatus of any of embodiments 1 to 10, wherein the instructions, when executed by the at least one processor, cause the apparatus at least to: estimate a channel response between a respective network node that transmits at least a portion of the signal samples and a respective receive antenna, at resource elements of the common data format; and generate the entries of the common data format that are missing based on the respective estimated channel response.

Embodiment 12. The apparatus of embodiment 11, wherein the instructions, when executed by the at least one processor, cause the apparatus at least to: estimate the channel response using linear mean squared error estimation given a respective signal vector at a respective receive antenna.

Embodiment 13. The apparatus of any of embodiments 11 to 12, wherein the instructions, when executed by the at least one processor, cause the apparatus at least to: train a machine learning channel estimation model with a dataset comprising measured channel responses and unmeasured channel responses, the labels of the dataset comprising the measured channel responses; and estimate the channel response using the machine learning channel estimation model.

Embodiment 14. The apparatus of any of embodiments 1 to 13, wherein the instructions, when executed by the at least one processor, cause the apparatus at least to: discard or set to zero at least one entry of the common data format corresponding to an unused resource; or reshape the common data format to be of a size of the machine learning model used to generate the at least one positioning measurement.

Embodiment 15. The apparatus of any of embodiments 1 to 14, wherein the instructions, when executed by the at least one processor, cause the apparatus at least to: rank the entries of the common data format based on whether a respective entry corresponds to an entry for which a respective signal sample was collected with a resource element, or to a generated entry previously missing.

Embodiment 16. The apparatus of any of embodiments 1 to 15, wherein the instructions, when executed by the at least one processor, cause the apparatus at least to: rank the entries of the common data format based on at least one of: a noise level of a resource element corresponding to an entry, or an interference level of the resource element corresponding to the entry.

Embodiment 17. The apparatus of any of embodiments 1 to 16, wherein the instructions, when executed by the at least one processor, cause the apparatus at least to: rank the entries of the common data format using a data structure; wherein at least one entry within the data structure corresponds to a weight of a carrier frequency; wherein at least one entry within the data structure corresponds to a weight of an orthogonal frequency division multiplexing symbol.

Embodiment 18. The apparatus of embodiment 17, wherein a first weight of a first carrier frequency is ranked higher than a second weight of a second carrier frequency when the first carrier frequency has over a period of time provided a more accurate positioning accuracy than the second carrier frequency.

Embodiment 19. The apparatus of any of embodiments 1 to 18, wherein the ranking indicates a reliability of measurements of different carriers, where the reliability is indicative of how interfered a carrier is or whether a direct wave is obstructed.

Embodiment 20. The apparatus of any of embodiments 1 to 19, wherein: a higher ranking entry is given more priority than a relatively lower ranking entry, a higher ranking entry is considered more important than a relatively lower ranking entry, or a higher ranking entry is considered more reliable than a relatively lower ranking entry.

Embodiment 21. The apparatus of any of embodiments 1 to 20, wherein the instructions, when executed by the at least one processor, cause the apparatus at least to: receive the ranking of the entries of the common data format from a location management function.

Embodiment 22. The apparatus of any of embodiments 1 to 21, wherein the at least one positioning measurement comprises at least one of: a location of a user equipment, coordinates of a location of a user equipment, a line of sight indicator, a non-line of sight indicator, a set of mappings between a respective line of sight and a respective signal source, or a combination of at least two of a location of a user equipment, coordinates of a location of a user equipment, a line of sight indicator, a non-line of sight indicator, or a set of mappings between a respective line of sight and a respective signal source.

Embodiment 23. The apparatus of any of embodiments 1 to 22, wherein the at least one positioning measurement comprises at least one of: a time of arrival, an angle of arrival, an angle of departure, a round trip time, delays of strongest reflections, or a combination of at least two of a time of arrival, an angle of arrival, an angle of departure, a round trip time, or delays of strongest reflections.

Embodiment 24. The apparatus of any of embodiments 1 to 23, wherein the instructions, when executed by the at least one processor, cause the apparatus at least to: train the machine learning model using a loss function based on a mean squared error of a location of a user equipment and a cross entropy of a line of sight.

Embodiment 25. The apparatus of any of embodiments 1 to 24, wherein the instructions, when executed by the at least one processor, cause the apparatus at least to: train the machine learning model with a dataset comprising at least one resource corresponding to a resource used for construction of the common data format; wherein labels of the dataset comprise a position of at least one user equipment, or a line of sight indicator for a respective network node.

Embodiment 26. The apparatus of any of embodiments 1 to 25, wherein the instructions, when executed by the at least one processor, cause the apparatus at least to: in response to the at least one positioning measurement not being within a range given with at least one first threshold expected positioning measurement and at least one second threshold expected positioning measurement, modify the ranking of the entries of the common data format, and regenerate the at least one positioning measurement with the machine learning model based on the entries of the common data format and the modified ranking of the entries of the common data format.

Embodiment 27. The apparatus of embodiment 26, wherein the instructions, when executed by the at least one processor, cause the apparatus at least to: transmit the modified ranking of the entries of the common data format to a location management function.

Embodiment 28. The apparatus of any of embodiments 1 to 27, wherein the apparatus comprises a terminal device, a user equipment, a base station, or a network element having a location management function.

Embodiment 29. The apparatus of any of embodiments 1 to 28, wherein the instructions, when executed by the at least one processor, cause the apparatus at least to: receive the plurality of signal samples from a plurality of network nodes in a wireless communication network.

Embodiment 30. An apparatus including: at least one processor; and at least one memory storing instructions that, when executed by the at least one processor, cause the apparatus at least to: receive a plurality of signal samples, wherein at least two of the signal samples are received with different resource elements; convert the plurality of signal samples to a common data format that stores as entries the plurality of signal samples, a stored entry corresponding to a signal sample measured with a resource element; generate entries of the common data format that are missing due to a signal sample not being measured with a resource element; wherein the entries of the common data format are ranked, wherein a higher ranking entry is considered more relevant than a relatively lower ranking entry; and generate at least one positioning measurement with a machine learning model, based on the entries of the common data format and the ranking of the entries of the common data format.

Embodiment 31. The apparatus of embodiment 30, wherein a resource element comprises one or more of: a frequency, time, receive antenna, or signal source.

Embodiment 32. The apparatus of any of embodiments 30 to 31, wherein at least two of the signal samples are received on different carrier frequencies.

Embodiment 33. The apparatus of any of embodiments 30 to 32, wherein at least two of the signal samples are received over different durations.

Embodiment 34. The apparatus of any of embodiments 30 to 33, wherein a duration corresponds to at least one of: a range of radio symbols, or a time associated with a respective radio symbol.

Embodiment 35. The apparatus of embodiment 34, wherein a radio symbol comprises an orthogonal frequency division multiplexing symbol.

Embodiment 36. The apparatus of any of embodiments 30 to 35, wherein the resource element comprises one subcarrier in a frequency domain and one orthogonal frequency division multiplexing symbol in a time domain.

Embodiment 37. The apparatus of any of embodiments 30 to 36, wherein a stored entry corresponds to a source of one of the received signal samples.

Embodiment 38. The apparatus of any of embodiments 30 to 37, wherein the common data format comprises a matrix.

Embodiment 39. The apparatus of any of embodiments 30 to 38, wherein a stored entry of the common data format corresponds to an orthogonal frequency division multiplexing symbol.

Embodiment 40. The apparatus of any of embodiments 30 to 39, wherein the instructions, when executed by the at least one processor, cause the apparatus at least to: generate the entries of the common data format that are missing with accounting for: a frequency, time, and space selectivity of a channel response, and an identifier of a transmitter of the signal samples.

Embodiment 41. The apparatus of any of embodiments 30 to 40, wherein a respective one of the entries that is missing corresponds to a resource element for which a signal sample was not collected.

Embodiment 42. The apparatus of any of embodiments 30 to 41, wherein the instructions, when executed by the at least one processor, cause the apparatus at least to: generate the entries of the common data format that are missing with interpolating between the stored entries.

Embodiment 43. The apparatus of any of embodiments 30 to 42, wherein the instructions, when executed by the at least one processor, cause the apparatus at least to: estimate a channel response between a respective network node that transmits at least a portion of the signal samples and a respective receive antenna, at resource elements of the common data format; and generate the entries of the common data format that are missing based on the respective estimated channel response.

Embodiment 44. The apparatus of embodiment 43, wherein the instructions, when executed by the at least one processor, cause the apparatus at least to: estimate the channel response using linear mean squared error estimation given a respective signal vector at a respective receive antenna.

Embodiment 45. The apparatus of any of embodiments 43 to 44, wherein the instructions, when executed by the at least one processor, cause the apparatus at least to: train a machine learning channel estimation model with a dataset comprising measured channel responses and unmeasured channel responses, the labels of the dataset comprising the measured channel responses; and estimate the channel response using the machine learning channel estimation model.

Embodiment 46. The apparatus of any of embodiments 40 to 45, wherein the instructions, when executed by the at least one processor, cause the apparatus at least to: discard or set to zero at least one entry of the common data format corresponding to an unused resource; or reshape the common data format to be of a size of the machine learning model used to generate the at least one positioning measurement.

Embodiment 47. The apparatus of any of embodiments 30 to 46, wherein the instructions, when executed by the at least one processor, cause the apparatus at least to: rank the entries of the common data format based on whether a respective entry corresponds to an entry for which a respective signal sample was collected with a resource element, or to a generated entry previously missing.

Embodiment 48. The apparatus of any of embodiments 30 to 47, wherein the instructions, when executed by the at least one processor, cause the apparatus at least to: rank the entries of the common data format based on at least one of: a noise level of a resource element corresponding to an entry, or an interference level of the resource element corresponding to the entry.

Embodiment 49. The apparatus of any of embodiments 30 to 48, wherein the instructions, when executed by the at least one processor, cause the apparatus at least to: rank the entries of the common data format using a data structure; wherein at least one entry within the data structure corresponds to a weight of a carrier frequency; wherein at least one entry within the data structure corresponds to a weight of an orthogonal frequency division multiplexing symbol.

Embodiment 50. The apparatus of embodiment 49, wherein a first weight of a first carrier frequency is ranked higher than a second weight of a second carrier frequency when the first carrier frequency has over a period of time provided a more accurate positioning accuracy than the second carrier frequency.

Embodiment 51. The apparatus of any of embodiments 30 to 50, wherein the ranking indicates a reliability of measurements of different carriers, where the reliability is indicative of how interfered a carrier is or whether a direct wave is obstructed.

Embodiment 52. The apparatus of any of embodiments 30 to 51, wherein: a higher ranking entry is given more priority than a relatively lower ranking entry, a higher ranking entry is considered more important than a relatively lower ranking entry, or a higher ranking entry is considered more reliable than a relatively lower ranking entry.

Embodiment 53. The apparatus of any of embodiments 30 to 52, wherein the instructions, when executed by the at least one processor, cause the apparatus at least to: receive the ranking of the entries of the common data format from a location management function.

Embodiment 54. The apparatus of any of embodiments 30 to 53, wherein the at least one positioning measurement comprises at least one of: a location of a user equipment, coordinates of a location of a user equipment, a line of sight indicator, a non-line of sight indicator, a set of mappings between a respective line of sight and a respective signal source, or a combination of at least two of a location of a user equipment, coordinates of a location of a user equipment, a line of sight indicator, a non-line of sight indicator, or a set of mappings between a respective line of sight and a respective signal source.

Embodiment 55. The apparatus of any of embodiments 30 to 54, wherein the at least one positioning measurement comprises at least one of: a time of arrival, an angle of arrival, an angle of departure, a round trip time, delays of strongest reflections, or a combination of at least two of a time of arrival, an angle of arrival, an angle of departure, a round trip time, or delays of strongest reflections.

Embodiment 56. The apparatus of any of embodiments 30 to 55, wherein the instructions, when executed by the at least one processor, cause the apparatus at least to: train the machine learning model using a loss function based on a mean squared error of a location of a user equipment and a cross entropy of a line of sight.

Embodiment 57. The apparatus of any of embodiments 30 to 56, wherein the instructions, when executed by the at least one processor, cause the apparatus at least to: train the machine learning model with a dataset comprising at least one resource corresponding to a resource used for construction of the common data format; wherein labels of the dataset comprise a position of at least one user equipment, or a line of sight indicator for a respective network node.

Embodiment 58. The apparatus of any of embodiments 30 to 57, wherein the instructions, when executed by the at least one processor, cause the apparatus at least to: in response to the at least one positioning measurement not being within a range given with at least one first threshold expected positioning measurement and at least one second threshold expected positioning measurement, modify the ranking of the entries of the common data format, and regenerate the at least one positioning measurement with the machine learning model based on the entries of the common data format and the modified ranking of the entries of the common data format.

Embodiment 59. The apparatus of embodiment 58, wherein the instructions, when executed by the at least one processor, cause the apparatus at least to: transmit the modified ranking of the entries of the common data format to a location management function.

Embodiment 60. The apparatus of any of embodiments 30 to 59, wherein the apparatus comprises a terminal device, a user equipment, a base station, or a network element having a location management function.

Embodiment 61. The apparatus of any of embodiments 30 to 60, wherein the instructions, when executed by the at least one processor, cause the apparatus at least to: receive the plurality of signal samples from a plurality of network nodes in a wireless communication network.

Embodiment 62. An apparatus including: at least one processor; and at least one memory storing instructions that, when executed by the at least one processor, cause the apparatus at least to: receive a plurality of signal samples, wherein at least two of the signal samples are received on different carrier frequencies, or wherein at least two of the signal samples are received over different durations; convert the plurality of signal samples to a common data format that stores as entries the plurality of signal samples, a stored entry corresponding to a signal sample measured with a carrier frequency, a time, and a receive antenna; generate entries of the common data format that are missing due to a signal sample not being measured with a carrier frequency, time, and receive antenna; wherein the entries of the common data format are ranked, wherein a higher ranking entry is considered more relevant than a relatively lower ranking entry; and generate at least one positioning measurement with a machine learning model, based on the entries of the common data format and the ranking of the entries of the common data format.

Embodiment 63. The apparatus of embodiment 62, wherein the instructions, when executed by the at least one processor, cause the apparatus at least to: generate the entries of the common data format that are missing with accounting for: a frequency, time, and space selectivity of a channel response, and an identifier of a transmitter of the signal samples.

Embodiment 64. The apparatus of any of embodiments 62 to 63, wherein the instructions, when executed by the at least one processor, cause the apparatus at least to: estimate a channel response between a respective network node that transmits at least a portion of the signal samples and a respective receive antenna, at resource elements of the common data format; and generate the entries of the common data format that are missing based on the respective estimated channel response.

Embodiment 65. The apparatus of embodiment 64, wherein the instructions, when executed by the at least one processor, cause the apparatus at least to: estimate the channel response using linear mean squared error estimation given a respective signal vector at a respective receive antenna; or train a machine learning channel estimation model with a dataset comprising measured channel responses and unmeasured channel responses, the labels of the dataset comprising the measured channel responses, and estimate the channel response using the machine learning channel estimation model.

Embodiment 66. The apparatus of any of embodiments 62 to 65, wherein the instructions, when executed by the at least one processor, cause the apparatus at least to: discard or set to zero at least one entry of the common data format corresponding to an unused resource; or reshape the common data format to be of a size of the machine learning model used to generate the at least one positioning measurement.

Embodiment 67. The apparatus of any of embodiments 62 to 66, wherein the instructions, when executed by the at least one processor, cause the apparatus at least to: rank the entries of the common data format based on at least one of: a noise level of a resource element corresponding to an entry, or an interference level of the resource element corresponding to the entry.

Embodiment 68. The apparatus of any of embodiments 62 to 67, wherein the instructions, when executed by the at least one processor, cause the apparatus at least to: rank the entries of the common data format using a data structure; wherein at least one entry within the data structure corresponds to a weight of a carrier frequency, wherein a first weight of a first carrier frequency is ranked higher than a second weight of a second carrier frequency when the first carrier frequency has over a period of time provided a more accurate positioning accuracy than the second carrier frequency; wherein at least one entry within the data structure corresponds to a weight of an orthogonal frequency division multiplexing symbol.

Embodiment 69. The apparatus of any of embodiments 62 to 68, wherein the at least one positioning measurement comprises at least one of: a location of a user equipment, coordinates of a location of a user equipment, a line of sight indicator, a non-line of sight indicator, a set of mappings between a respective line of sight and a respective signal source, or a combination of at least two of a location of a user equipment, coordinates of a location of a user equipment, a line of sight indicator, a non-line of sight indicator, or a set of mappings between a respective line of sight and a respective signal source.

Embodiment 70. The apparatus of any of embodiments 62 to 69, wherein the instructions, when executed by the at least one processor, cause the apparatus at least to: train the machine learning model using a loss function based on a mean squared error of a location of a user equipment and a cross entropy of a line of sight.

Embodiment 71. The apparatus of any of embodiments 62 to 70, wherein the instructions, when executed by the at least one processor, cause the apparatus at least to: in response to the at least one positioning measurement not being within a range given with at least one first threshold expected positioning measurement and at least one second threshold expected positioning measurement, modify the ranking of the entries of the common data format, and regenerate the at least one positioning measurement with the machine learning model based on the entries of the common data format and the modified ranking of the entries of the common data format.

Embodiment 72. An apparatus including: at least one processor; and at least one memory storing instructions that, when executed by the at least one processor, cause the apparatus at least to: receive a plurality of signal samples, wherein at least two of the signal samples are received with different resource elements; convert the plurality of signal samples to a common data format that stores as entries the plurality of signal samples, a stored entry corresponding to a signal sample measured with a resource element; generate entries of the common data format that are missing due to a signal sample not being measured with a resource element; wherein the entries of the common data format are ranked, wherein a higher ranking entry is considered more relevant than a relatively lower ranking entry; and generate at least one positioning measurement with a machine learning model, based on the entries of the common data format and the ranking of the entries of the common data format.

Embodiment 73. The apparatus of embodiment 72, wherein the instructions, when executed by the at least one processor, cause the apparatus at least to: generate the entries of the common data format that are missing with accounting for: a frequency, time, and space selectivity of a channel response, and an identifier of a transmitter of the signal samples.

Embodiment 74. The apparatus of any of embodiments 72 to 73, wherein the instructions, when executed by the at least one processor, cause the apparatus at least to: estimate a channel response between a respective network node that transmits at least a portion of the signal samples and a respective receive antenna, at resource elements of the common data format; and generate the entries of the common data format that are missing based on the respective estimated channel response.

Embodiment 75. The apparatus of any of embodiments 72 to 74, wherein the instructions, when executed by the at least one processor, cause the apparatus at least to: rank the entries of the common data format based on at least one of: a noise level of a resource element corresponding to an entry, or an interference level of the resource element corresponding to the entry.

Embodiment 76. The apparatus of any of embodiments 72 to 75, wherein the at least one positioning measurement comprises at least one of: a location of a user equipment, coordinates of a location of a user equipment, a line of sight indicator, a non-line of sight indicator, a set of mappings between a respective line of sight and a respective signal source, or a combination of at least two of a location of a user equipment, coordinates of a location of a user equipment, a line of sight indicator, a non-line of sight indicator, or a set of mappings between a respective line of sight and a respective signal source.

Embodiment 77. A method including: receiving a plurality of signal samples, wherein at least two of the signal samples are received on different carrier frequencies, or wherein at least two of the signal samples are received over different durations; converting the plurality of signal samples to a common data format that stores as entries the plurality of signal samples, a stored entry corresponding to a signal sample measured with a carrier frequency, a time, and a receive antenna; generating entries of the common data format that are missing due to a signal sample not being measured with a carrier frequency, time, and receive antenna; wherein the entries of the common data format are ranked, wherein a higher ranking entry is considered more relevant than a relatively lower ranking entry; and generating at least one positioning measurement with a machine learning model, based on the entries of the common data format and the ranking of the entries of the common data format.

Embodiment 78. A method including: receiving a plurality of signal samples, wherein at least two of the signal samples are received with different resource elements; converting the plurality of signal samples to a common data format that stores as entries the plurality of signal samples, a stored entry corresponding to a signal sample measured with a resource element; generating entries of the common data format that are missing due to a signal sample not being measured with a resource element; wherein the entries of the common data format are ranked, wherein a higher ranking entry is considered more relevant than a relatively lower ranking entry; and generating at least one positioning measurement with a machine learning model, based on the entries of the common data format and the ranking of the entries of the common data format.

Embodiment 79. An apparatus including: means for receiving a plurality of signal samples, wherein at least two of the signal samples are received on different carrier frequencies, or wherein at least two of the signal samples are received over different durations; means for converting the plurality of signal samples to a common data format that stores as entries the plurality of signal samples, a stored entry corresponding to a signal sample measured with a carrier frequency, a time, and a receive antenna; means for generating entries of the common data format that are missing due to a signal sample not being measured with a carrier frequency, time, and receive antenna; wherein the entries of the common data format are ranked, wherein a higher ranking entry is considered more relevant than a relatively lower ranking entry; and means for generating at least one positioning measurement with a machine learning model, based on the entries of the common data format and the ranking of the entries of the common data format, Embodiment 80. An apparatus including: means for receiving a plurality of signal samples, wherein at least two of the signal samples are received with different resource elements; means for converting the plurality of signal samples to a common data format that stores as entries the plurality of signal samples, a stored entry corresponding to a signal sample measured with a resource element; means for generating entries of the common data format that are missing due to a signal sample not being measured with a resource element; wherein the entries of the common data format are ranked, wherein a higher ranking entry is considered more relevant than a relatively lower ranking entry; and means for generating at least one positioning measurement with a machine learning model, based on the entries of the common data format and the ranking of the entries of the common data format.

Embodiment 81. A non-transitory program storage device readable by a machine, tangibly embodying a program of instructions executable by the machine for performing operations, the operations including: receiving a plurality of signal samples, wherein at least two of the signal samples are received on different carrier frequencies, or wherein at least two of the signal samples are received over different durations; converting the plurality of signal samples to a common data format that stores as entries the plurality of signal samples, a stored entry corresponding to a signal sample measured with a carrier frequency, a time, and a receive antenna; generating entries of the common data format that are missing due to a signal sample not being measured with a carrier frequency, time, and receive antenna; wherein the entries of the common data format are ranked, wherein a higher ranking entry is considered more relevant than a relatively lower ranking entry; and generating at least one positioning measurement with a machine learning model, based on the entries of the common data format and the ranking of the entries of the common data format.

Embodiment 82. A non-transitory program storage device readable by a machine, tangibly embodying a program of instructions executable by the machine for performing operations, the operations including: receiving a plurality of signal samples, wherein at least two of the signal samples are received with different resource elements; converting the plurality of signal samples to a common data format that stores as entries the plurality of signal samples, a stored entry corresponding to a signal sample measured with a resource element; generating entries of the common data format that are missing due to a signal sample not being measured with a resource element; wherein the entries of the common data format are ranked, wherein a higher ranking entry is considered more relevant than a relatively lower ranking entry; and generating at least one positioning measurement with a machine learning model, based on the entries of the common data format and the ranking of the entries of the common data format.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The one or more memories as described herein may be implemented using any suitable data storage technology, such as semiconductor based memory devices, flash memory, magnetic memory devices and systems, optical memory devices and systems, non-transitory memory, transitory memory, fixed memory and removable memory. The one or more memories may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and one or more memories that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In the figures, arrows and lines between individual blocks represent operational couplings there-between, and arrows represent direction of data flows on those couplings.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are given as follows (the abbreviations and acronyms may be appended with each other or with other characters using e.g. a dash, hyphen, or number):

2D two dimensional
3D three dimensional
3GPP third generation partnership project
4G fourth generation
5G fifth generation
5GC 5G core network
AI artificial intelligence
AMF access and mobility management function
AOA angle of arrival
ASIC application-specific integrated circuit
BM beam management
BS base station
BW bandwidth
CD compact/computer disc
CE cross entropy
CNN convolutional neural network
comb combination
CPU central processing unit
CSI channel state information
CSI-RS channel state information reference signal
CU central unit or centralized unit
DL downlink
DSP digital signal processor
DUT device under test
DVD digital versatile disc
eNB evolved Node B (e.g., an LTE base station)
EN-DC E-UTRAN new radio-dual connectivity
en-gNB node providing NR user plane and control plane protocol terminations towards the UE, and acting as a secondary node in EN-DC
E-UTRA evolved universal terrestrial radio access, i.e., the LTE radio access technology
E-UTRAN E-UTRA network
f frequency, e.g. f1 of FIG. 5
F1 interface between the CU and the DU
FCNN fully connected neural network
FPGA field-programmable gate array
GNSS global navigation satellite system
gNB base station for 5G/NR, i.e., a node providing NR user plane and gNB control plane protocol terminations towards the UE, and connected via the NG interface to the 5GC
IAB integrated access and backhaul
ID identifier
I/F interface
I/O input/output
LMF location management function
LMMSE linear minimum mean-squared error
LOS line of sight
LTE long term evolution (4G)
MAC medium access control
ML machine learning
MME mobility management entity
MRO mobility robustness optimization
MSE mean squared error
NCE network control element
ng or NG new generation
ng-eNB new generation eNB
NG-RAN new generation radio access network
NLOS non line of sight
NR new radio
N/W network
OFDM orthogonal frequency-division multiplexing
PDA personal digital assistant
PDCP packet data convergence protocol
PDU protocol data unit
PFL positioning frequency layer
PHY physical layer
PM positioning measurement PRB physical resource block
PRS positioning reference signal
PRU positioning reference unit
R1 RAN meeting
RAM random access memory
RAN radio access network
RAN1 radio layer 1
RAN2 radio layer 2
RAN4 radio performance and protocol aspects
RE resource element
Rel release
RF radio frequency
RLC radio link control
ROM read-only memory
RP RAN meeting
RRC radio resource control
RRM radio resource management
RS reference signal
RSTD reference/received signal time difference
RTOA relative time of arrival
RU radio unit
Rx receiver or reception
SGW serving gateway
SI study item
SMF session management function
SNR signal to noise ratio
SON self-organizing/optimizing network
SRS sounding reference signal
TF transformer
TRP transmission reception point
TS technical specification
Tx transmitter or transmission
UAV unmanned aerial vehicle
UE user equipment (e.g., a wireless, typically mobile device)
UPF user plane function
URI uniform resource identifier
USB universal serial bus
WI work item
WID work item description
X2 network interface between RAN nodes and between RAN and the core network
Xn network interface between NG-RAN nodes

The invention claimed is:

1. An apparatus comprising:
at least one processor; and
at least one memory storing instructions that, when executed by the at least one processor, cause the apparatus at least to:
receive a plurality of signal samples, wherein at least two of the signal samples are received on different carrier frequencies, or wherein at least two of the signal samples are received over different durations;
convert the plurality of signal samples to a common data format that stores as entries the plurality of signal samples, a stored entry corresponding to a signal sample measured with a carrier frequency, a time, and a receive antenna;
generate entries of the common data format that are missing due to a signal sample not being measured with a carrier frequency, time, and receive antenna;
wherein the entries of the common data format are ranked, wherein a higher ranking entry is considered more relevant than a relatively lower ranking entry; and
generate at least one positioning measurement with a machine learning model, based on the entries of the common data format and the ranking of the entries of the common data format.

2. The apparatus of claim 1, wherein the instructions, when executed by the at least one processor, cause the apparatus at least to:
generate the entries of the common data format that are missing with accounting for:
a frequency, time, and space selectivity of a channel response, and
an identifier of a transmitter of the signal samples.

3. The apparatus of claim 1, wherein the instructions, when executed by the at least one processor, cause the apparatus at least to:
estimate a channel response between a respective network node that transmits at least a portion of the signal samples and a respective receive antenna, at resource elements of the common data format; and
generate the entries of the common data format that are missing based on the respective estimated channel response.

4. The apparatus of claim 3, wherein the instructions, when executed by the at least one processor, cause the apparatus at least to:
estimate the channel response using linear mean squared error estimation given a respective signal vector at a respective receive antenna; or
train a machine learning channel estimation model with a dataset comprising measured channel responses and unmeasured channel responses, the labels of the dataset comprising the measured channel responses, and estimate the channel response using the machine learning channel estimation model.

5. The apparatus of claim 1, wherein the instructions, when executed by the at least one processor, cause the apparatus at least to:
discard or set to zero at least one entry of the common data format corresponding to an unused resource; or
reshape the common data format to be of a size of the machine learning model used to generate the at least one positioning measurement.

6. The apparatus of claim 1, wherein the instructions, when executed by the at least one processor, cause the apparatus at least to:
rank the entries of the common data format based on at least one of: a noise level of a resource element corresponding to an entry, or an interference level of the resource element corresponding to the entry.

7. The apparatus of claim 1, wherein the instructions, when executed by the at least one processor, cause the apparatus at least to:
rank the entries of the common data format using a data structure;
wherein at least one entry within the data structure corresponds to a weight of a carrier frequency, wherein a first weight of a first carrier frequency is ranked higher than a second weight of a second carrier frequency when the first carrier frequency has over a period of time provided a more accurate positioning accuracy than the second carrier frequency;
wherein at least one entry within the data structure corresponds to a weight of an orthogonal frequency division multiplexing symbol.

8. The apparatus of claim 1, wherein the at least one positioning measurement comprises at least one of:
- a location of a user equipment,
- coordinates of a location of a user equipment,
- a line of sight indicator,
- a non-line of sight indicator,
- a set of mappings between a respective line of sight and a respective signal source, or
- a combination of at least two of a location of a user equipment, coordinates of a location of a user equipment, a line of sight indicator, a non-line of sight indicator, or a set of mappings between a respective line of sight and a respective signal source.

9. The apparatus of claim 1, wherein the instructions, when executed by the at least one processor, cause the apparatus at least to:
- train the machine learning model using a loss function based on a mean squared error of a location of a user equipment and a cross entropy of a line of sight.

10. The apparatus of claim 1, wherein the instructions, when executed by the at least one processor, cause the apparatus at least to:
- in response to the at least one positioning measurement not being within a range given with at least one first threshold expected positioning measurement and at least one second threshold expected positioning measurement, modify the ranking of the entries of the common data format, and regenerate the at least one positioning measurement with the machine learning model based on the entries of the common data format and the modified ranking of the entries of the common data format.

11. An apparatus comprising:
- at least one processor; and
- at least one memory storing instructions that, when executed by the at least one processor, cause the apparatus at least to:
- receive a plurality of signal samples, wherein at least two of the signal samples are received with different resource elements;
- convert the plurality of signal samples to a common data format that stores as entries the plurality of signal samples, a stored entry corresponding to a signal sample measured with a resource element;
- generate entries of the common data format that are missing due to a signal sample not being measured with a resource element;
- wherein the entries of the common data format are ranked, wherein a higher ranking entry is considered more relevant than a relatively lower ranking entry; and
- generate at least one positioning measurement with a machine learning model, based on the entries of the common data format and the ranking of the entries of the common data format.

12. The apparatus of claim 11, wherein the instructions, when executed by the at least one processor, cause the apparatus at least to:
- generate the entries of the common data format that are missing with accounting for:
- a frequency, time, and space selectivity of a channel response, and
- an identifier of a transmitter of the signal samples.

13. The apparatus of claim 11, wherein the instructions, when executed by the at least one processor, cause the apparatus at least to:
- estimate a channel response between a respective network node that transmits at least a portion of the signal samples and a respective receive antenna, at resource elements of the common data format; and
- generate the entries of the common data format that are missing based on the respective estimated channel response.

14. The apparatus of claim 11, wherein the instructions, when executed by the at least one processor, cause the apparatus at least to:
- rank the entries of the common data format based on at least one of: a noise level of a resource element corresponding to an entry, or an interference level of the resource element corresponding to the entry.

15. The apparatus of claim 11, wherein the at least one positioning measurement comprises at least one of:
- a location of a user equipment,
- coordinates of a location of a user equipment,
- a line of sight indicator,
- a non-line of sight indicator,
- a set of mappings between a respective line of sight and a respective signal source, or
- a combination of at least two of a location of a user equipment, coordinates of a location of a user equipment, a line of sight indicator, a non-line of sight indicator, or a set of mappings between a respective line of sight and a respective signal source.

* * * * *